United States Patent

Daniel

[15] 3,695,562
[45] Oct. 3, 1972

[54] ADJUSTABLE SUPPORT

[72] Inventor: Cecil A. Daniel, 2006 Calle Cantara, El Cajon, Calif. 92020

[22] Filed: Aug. 26, 1970

[21] Appl. No.: 66,993

[52] U.S. Cl. ................................. 248/23, 308/15
[51] Int. Cl. .......................................... F16m 5/00
[58] Field of Search ...... 248/358 R, 346, 179, 24, 23, 248/16, 354 R; 308/15

[56] References Cited

UNITED STATES PATENTS

| 2,806,131 | 9/1957 | Palmer | 248/346 X |
| 2,414,996 | 1/1947 | Armstrong | 248/346 X |
| 2,510,688 | 6/1950 | Evans et al. | 248/354 |
| 2,922,609 | 1/1960 | Collier | 148/179 |

FOREIGN PATENTS OR APPLICATIONS

| 1,333,785 | 6/1963 | France | 248/23 |
| 51,691 | 12/1941 | Netherlands | 248/358 R |

Primary Examiner—J. Franklin Foss
Attorney—Robert C. Comstock

[57] ABSTRACT

An adjustable support for mounting machinery or equipment. A housing has a ball enclosure with an open top, over which a support platform is mounted for universal tilting movement on a central post. The platform is supported by a large number of loose balls held within the ball enclosure. The load being supported exerts downward pressure on the platform to shift the balls and permit the platform to adjust to any desired angle. The height of the platform is adjusted by adding to or subtracting from the supply of balls within the ball enclosure by screw threaded operation of pusher blocks in a pair of ball storage chambers connected to the corners of the ball enclosure.

8 Claims, 4 Drawing Figures

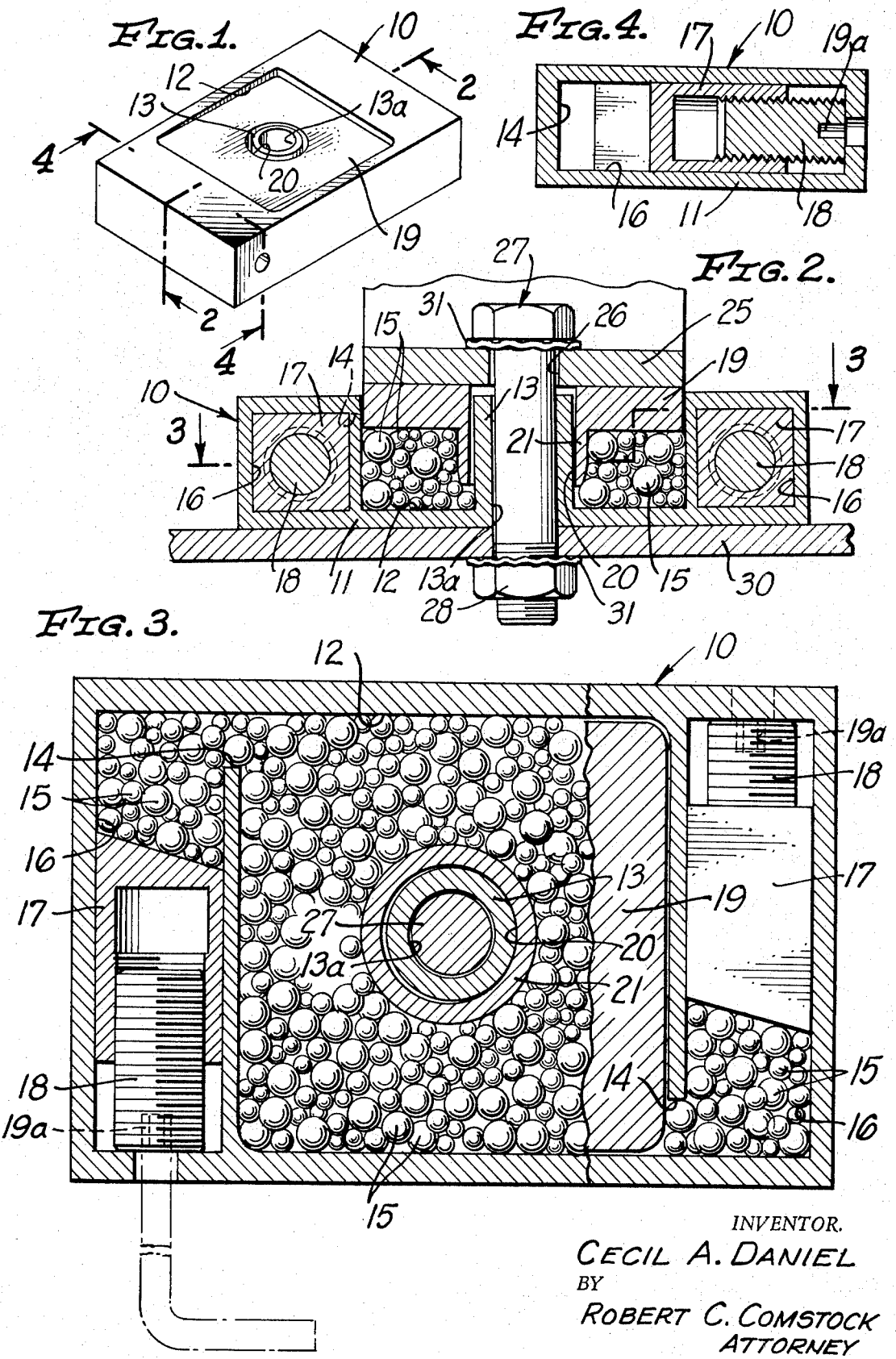

ADJUSTABLE SUPPORT

BACKGROUND OF THE INVENTION

1. Field of the Invention

The invention relates to a support which is tiltably adjustable to any desired angle and which is also adjustable as to height. The support is particularly suitable for use in mounting machinery on the foundation of a ship, although it is capable of numerous other industrial applications.

2. Description of the Prior Art

Adjustable supports of the type which are now in use do not have the necessary universality of adjustable movement. In many cases, they are relatively complex both in their structure and in their operation. Some supports, such as those now used on ships, are custom fitted by costly repeated machining until they meet the requirements of each individual situation.

This device is particularly adapted for use on the foundation or deck of a ship to mount turbines, pumps, generators, shafts, bearings, motors and other equipment and devices at the proper angle and alignment. Perfect alignment of such equipment is essential for its proper operation and such alignment is difficult and costly to achieve and maintain with supports and techniques of the type now in use.

Supports of the type now in use on ships are customarily machined to the desired shape. Even so, distortions in the structure of the ship often prevent complete alignment of all four corners of the support.

SUMMARY OF THE INVENTION

The invention comprises an adjustable support in which a platform is tiltably mounted on a plurality of small balls. The balls shift with the weight placed upon them by the load, thus providing universal tilting adjustment of the load and mounting platform to any desired angle whatsoever. The height of the platform is adjustable by adding to or subtracting from the number of balls supporting the platform.

The device is a definite improvement over supporting devices and techniques of the type now in use on ships. It is equally capable of use on land in various unlimited mechanical, electrical and industrial applications in which simple and precise adjustable support and/or alignment is required or desired.

It is accordingly the primary object of the invention to provide an improved and simplified adjustable support for substantially any use or application. It is particularly an object of the invention to provide such a support which affords universal adjustability to any desired angle, along with adjustability in height as well.

Another object of the invention is to provide a new type of adjustable support which is more economical both in materials and labor than supports and techniques of the type which are now in use.

It is thus among the objects of the invention to provide an adjustable support having all of the advantages and benefits set forth above and hereinafter in this specification. The invention also comprises such other objects, advantages and capabilities as will later more fully appear and which are inherently possessed by the invention.

While I have shown in the accompanying drawings a preferred embodiment of the invention, it should be understood that the same is susceptible of modification and change without departing from the spirit of the invention.

DESCRIPTION OF THE DRAWINGS

FIG. 1 is an isometric view on a reduced scale of my adjustable support;

FIG. 2 is a sectional view of the support taken on line 2—2 of FIG. 1, showing the support in use;

FIG. 3 is a sectional view of the support taken on line 3—3 of FIG. 2;

FIG. 4 is a sectional view of the support taken on line 4—4 of FIG. 1.

Description of the Preferred Embodiment

A preferred embodiment which has been selected to illustrate the invention comprises a housing 10, which may have any desired shape whatsoever. An oblong rectangular shape has been chosen for simplicity of structure and operation, but the shape may be round, oval, triangular, star-shaped or any other simple or complex shape which will function satisfactorily.

The housing 10 is provided with a substantially flat bottom 11, which is adapted to rest upon a foundation, deck, floor, support, etc. The center portion of the housing 10 comprises a ball enclosure 12, which surrounds a center post 13. An opening 13a of circular diameter extends through the post 13 and through the bottom of the housing 10. The inside corners of the enclosure 12 are preferably somewhat round. Adjacent two diagonally opposite corners of the enclosure 12 are a pair of openings 14 through which balls may be inserted into or removed from the enclosure 12.

The ball enclosure 12 is filled with a substantially large number of balls 15, which may be formed of metal or other suitable preferably hard material. It is preferable that the balls 15 should not all have the identical diameter, since this is likely to lead to undesirable precise alignment or stacking of the balls instead of their more desirable random placement.

For example, in one small embodiment of the device the enclosure 12 was approximately 2½ inches square and was filled with balls having diameters of three-sixteenth inch, one-eighth inch and 0.090 inch. The balls 15 are preferably intermingled and form a plurality of layers in both horizontal directions and in a vertical direction as well.

An elongated pair of ball storage chambers 16 are disposed within the housing 10 on opposite sides of the ball enclosure 12. The ends of the storage chambers 16 are connected to the enclosure 12 through the openings 14.

Each of the storage chambers 16 is adapted to hold an adjustable supply of balls 15, which may be added to or subtracted from the supply of balls 15 within the enclosure 12. This adjustment is achieved through the longitudinal movement of a pusher block 17, one of which is disposed within each of the storage chambers 16, directly behind the balls 15. Each of the pusher blocks 17 preferably has an angularly directed front face.

Movement of pusher block 17 within the storage chambers 16 is achieved by rotation of a screw 18 which is screw threadedly connected to the pusher block 17. The screw 18 may have an internal socket 19 capable of engagement with a hexagonal wrench, as shown, or any other suitable means may be provided for rotating the screw 18 and/or longitudinally moving the pusher block 17.

The enclosure 12 is completely closed except for the openings 14 and an open top which is closed off by a support platform 19, which is complementary in shape to the open top of the enclosure 12. The center of the support platform 19 is provided with an opening 20 of circular diameter which extends completely through the platform 19 and through a tubular extension 21 which protrudes downwardly into the enclosure 12 surrounding the post 13. The outer surface of the extension 21 is preferably rounded to prevent excessive frictional engagement with the adjacent balls.

The opening 20 in the support platform 19 is preferably slightly larger in inside diameter than the outside diameter of post 13. The support platform 19 is accordingly free to tilt in any direction with respect to the post 13.

In use, the enclosure 12 and storage chambers 16 are substantially filled with a plurality of loose and freely movable balls 15. The bottom of the housing 10 is placed on whatever foundation, deck, support or the like as may comprise the mounting for the particular piece of machinery or equipment involved.

The base of mounting frame or the like of the machinery or equipment is then mounted on top of the support platform 19 in such a manner as to exert downward force upon the top of the support platform 19. The machinery or equipment is customarily provided with at least one and customarily with a plurality of mounting feet or flanges 25. The flanges 25 rest upon the platform 19. Each flange 25 customarily has a circular opening 26 for receiving a bolt or fastening member 27, which also extends through the opening 20 in the platform 19 and through an aligned opening in the base or foundation 30 upon which the housing rests.

The head of the fastening member 27 engages the top of the platform 19, while the nut 28 engages the bottom of the foundation or base 30. The platform 19 is free to assume any desired angularity with respect to the foundation or base 30 and to be held in such position by tightening of the fastening member 27. A spring washer 31 may be used beneath the head of the fastening member and above the nut 28 to compensate for the slight variation in angularity caused by the tilting of the platform 19.

Because the platform of each support member is capable of tilting independently of the others, it is possible to align four or more corners independently and correctly. The user may employ any number of supports, as required for each particular application. In the case of a square or rectangular device, a support may be used at each of the four corners. In case of a device having a circular or other shape, a plurality of spaced supports may be used. In all cases, the number of supports corresponds to the number of mounting engagements between the equipment and the foundation.

It will be noted that inward movement of the pusher blocks 17 exerts pressure on the balls 15 in the storage chambers 16, causing them to pass through the openings 14 into the ball enclosure 12 against the downward pressure exerted on the balls 25 by the platform 19.

When the pusher blocks 17 are moved outwardly, the downward pressure exerted upon the balls 15 by the flanges 25 and platform 19 causes the balls 15 to move out of the ball enclosure 12 through the openings 14 into the storage chambers 16.

I claim:

1. An adjustable support comprising a housing, a ball enclosure formed within said housing, said ball enclosure having an open top, a load support platform universally tiltably mounted over said open top, said platform adapted to receive simultaneously downward and angular pressure from the load being supported, a plurality of small balls loosely disposed within said enclosure, said balls substantially filling said enclosure and supporting said platform against the downward and angular pressure exerted on said platform by said load, said balls forming a plurality of layers in both horizontal directions and in a vertical direction, said balls being shiftable with respect to each other within said enclosure to adjust the angularity of said support platform in response to particular angularity of the pressure exerted upon said platform by said load, and means for adding to and subtracting from the supply of balls within said ball enclosure to adjust the height of said platform.

2. The structure described in claim 1, said support comprising a plurality of said housings disposed beneath at least the four corners of said load to provide angular adjustment and alignment of said corners.

3. The structure described in claim 1, and a post extending vertically through said ball enclosure, housing and support platform adjacent to the center of said platform, said platform being tiltably mounted on said post.

4. The structure described in claim 3, said post having an opening therein, and a fastening member extending through said opening and through a mounting member connected to the load being supported to hold said platform and load in adjusted position.

5. The structure described in claim 1, said means comprising at least one ball storage chamber disposed adjacent to and connected with said ball enclosure, said storage chamber being adapted to hold a plurality of said balls, and means for varying the size of said storage chamber to add to or subtract from the number of balls within said ball enclosure.

6. The structure described in claim 5, one of said ball storage chambers being disposed on each side of said ball enclosure, said storage chambers being connected to said ball enclosure adjacent diagonally opposite corners thereof, a pusher block mounted for longitudinal movement within each of said storage chambers and means threadedly engaged with said pusher block to control the movement of said pusher block and thereby control the movement of said balls to and from said ball enclosure.

7. The structure described in claim 5, in which some of said balls have a different outside diameter from the remainder of said balls.

8. The structure described in claim 7, and a post extending vertically through said ball enclosure, housing and support platform adjacent to the center of said platform, said platform being tiltably mounted on said post, said post having an opening therein, and a fastening member extending through said opening and through a mounting flange connected to the load being supported to hold said platform and load in adjusted position.

* * * * *